US009008278B2

(12) United States Patent
Lee et al.

(10) Patent No.: US 9,008,278 B2

(45) Date of Patent: Apr. 14, 2015

(54) MULTILAYER X-RAY SOURCE TARGET WITH HIGH THERMAL CONDUCTIVITY

(71) Applicant: General Electric Company, Schenectady, NY (US)

(72) Inventors: Susanne Madeline Lee, Cohoes, NY (US); Raj Bahadur, Schenectady, NY (US); Sudeep Mandal, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 333 days.

(21) Appl. No.: 13/730,303

(22) Filed: Dec. 28, 2012

(65) Prior Publication Data

US 2014/0185778 A1 Jul. 3, 2014

(51) Int. Cl.

| | |
|---|---|
| ***H01J 35/06*** | (2006.01) |
| ***B82Y 99/00*** | (2011.01) |
| ***H01J 5/18*** | (2006.01) |
| ***G21K 1/06*** | (2006.01) |
| ***H01J 35/12*** | (2006.01) |

(52) U.S. Cl.

CPC . *G21K 1/06* (2013.01); *H01J 35/12* (2013.01); *H01J 5/18* (2013.01); *H01J 2235/088* (2013.01); *H01J 2235/087* (2013.01)

(58) Field of Classification Search

CPC ........... H01J 5/18; H01J 47/004; H01J 35/02; H01J 35/08; H01J 35/18

See application file for complete search history.

(56) References Cited

U.S. PATENT DOCUMENTS

| | | | | |
|---|---|---|---|---|
| 4,029,828 | A * | 6/1977 | Bildstein et al. | 378/143 |
| 4,477,921 | A * | 10/1984 | Armini et al. | 378/34 |
| 5,420,906 | A * | 5/1995 | Smit et al. | 378/141 |
| 5,657,365 | A * | 8/1997 | Yamamoto et al. | 378/143 |
| 6,463,123 | B1 * | 10/2002 | Korenev | 378/69 |
| 6,577,708 | B2 | 6/2003 | Chapman et al. | |
| 7,391,850 | B2 | 6/2008 | Kaertner et al. | |

(Continued)

FOREIGN PATENT DOCUMENTS

| | | | | |
|---|---|---|---|---|
| EP | 2238908 A1 * | 10/2010 | | A61B 6/03 |
| WO | WO 2005119730 A2 * | 12/2005 | | H01J 35/00 |

(Continued)

OTHER PUBLICATIONS

Kelly, "Phase Contrast Imaging With a Laboratory-Based Microfocus X-Ray Source", Durham University England, pp. 1-249, May 2007.

(Continued)

*Primary Examiner* — David A Vanore

(74) *Attorney, Agent, or Firm* — Robert M. McCarthy

(57) ABSTRACT

In one embodiment, an X-ray source is provided that includes one or more electron emitters configured to emit one or more electron beams and one or more source targets configured to receive the one or more electron beams emitted by the one or more electron emitters and, as a result of receiving the one or more electron beams, to emit X-rays. Each source target of the X-ray source includes a first layer having one or more first materials; and a second layer in thermal communication with the first layer and having one or more second materials. The first layer is positioned closer to the one or more emitters than the second layer, the first material has a higher overall thermal conductivity than the second layer, and the second layer produces the majority of the X-rays emitted by the source target.

45 Claims, 8 Drawing Sheets

(56) References Cited

U.S. PATENT DOCUMENTS

| | | | | |
|---|---|---|---|---|
| 7,505,560 | B2 | 3/2009 | Ando et al. | |
| 7,555,102 | B1 | 6/2009 | Renard-Le Galloudec et al. | |
| 7,693,256 | B2 | 4/2010 | Brahme et al. | |
| 7,738,945 | B2 | 6/2010 | Fauver et al. | |
| 7,817,777 | B2 | 10/2010 | Baumann et al. | |
| 7,817,779 | B2 | 10/2010 | Ando | |
| 7,889,838 | B2 | 2/2011 | David et al. | |
| 8,173,983 | B1 | 5/2012 | Sahadevan | |
| 8,204,174 | B2 | 6/2012 | Connor et al. | |
| 8,208,602 | B2 | 6/2012 | Lee et al. | |
| 8,837,680 | B2 * | 9/2014 | Tsujii et al. | 378/143 |
| 8,879,690 | B2 * | 11/2014 | Chaki et al. | 378/136 |
| 2003/0086533 | A1 * | 5/2003 | Janik et al. | 378/138 |
| 2007/0291896 | A1 | 12/2007 | Parham et al. | |
| 2009/0283682 | A1 * | 11/2009 | Star-Lack et al. | 250/363.1 |
| 2009/0316860 | A1 * | 12/2009 | Okunuki et al. | 378/122 |
| 2010/0201240 | A1 * | 8/2010 | Heinke et al. | 313/35 |
| 2012/0039438 | A1 | 2/2012 | Parham et al. | |
| 2012/0163547 | A1 * | 6/2012 | Lee et al. | 378/120 |
| 2012/0170718 | A1 * | 7/2012 | Travish et al. | 378/122 |
| 2012/0269326 | A1 * | 10/2012 | Adler et al. | 378/138 |
| 2013/0287174 | A1 * | 10/2013 | Zhou et al. | 378/91 |
| 2014/0029727 | A1 * | 1/2014 | Ono | 378/121 |
| 2014/0079188 | A1 * | 3/2014 | Hesselink et al. | 378/136 |
| 2014/0086388 | A1 * | 3/2014 | Yamada et al. | 378/62 |
| 2014/0140484 | A1 * | 5/2014 | Shiraki et al. | 378/98 |
| 2014/0177800 | A1 * | 6/2014 | Sato et al. | 378/62 |
| 2014/0177801 | A1 * | 6/2014 | Lee et al. | 378/73 |
| 2014/0177809 | A1 * | 6/2014 | Danyluk et al. | 378/140 |
| 2014/0185778 | A1 * | 7/2014 | Lee et al. | 378/124 |
| 2014/0211919 | A1 * | 7/2014 | Ogura et al. | 378/62 |
| 2014/0369469 | A1 * | 12/2014 | Ogura et al. | 378/62 |
| 2014/0369471 | A1 * | 12/2014 | Ogura et al. | 378/62 |

FOREIGN PATENT DOCUMENTS

| | | | | | |
|---|---|---|---|---|---|
| WO | WO 2008062519 | A1 * | 5/2008 | | H01J 35/04 |
| WO | WO 2010018502 | A1 * | 2/2010 | | H01J 35/10 |
| WO | WO 2010019228 | A2 * | 2/2010 | | H05H 9/04 |
| WO | WO 2010012403 | A3 * | 3/2010 | | G21K 5/00 |
| WO | WO 2010109909 | A1 * | 9/2010 | | H05G 1/52 |

OTHER PUBLICATIONS

Herzen, "A Grating Interferometer for Materials Science Imaging at a Second-Geneaton Synchroton Radiation Source", Zur Erlangung des Doktorgrades des Department Physik der Universit at Hamburg, pp. 1-108, 2010.

Kim., "A Study of an Areas X-Ray Source for Diffraction Enhanced Imaging for Clinical and Industrial Applications" MSC, Department of Nuclear Engineering, North Carolina State University, Raleigh, North Carolina, pp. 1-88, 2004.

* cited by examiner

MULTILAYER X-RAY SOURCE TARGET WITH HIGH THERMAL CONDUCTIVITY

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A variety of diagnostic, laboratory, and other systems (e.g., radiation-based treatment systems) may utilize X-ray tubes as a source of radiation. Typically, the X-ray tube includes a cathode and an anode. An emitter within the cathode may emit a stream of electrons. The anode may include a target that is impacted by the stream of electrons. As a result of this impact, the target may emit radiation. A large portion of the energy deposited into the target by the electron beam produces heat, with another portion of the energy resulting in the production of X-ray radiation. Of the X-ray radiation that is emitted, two types may result: (1) Bremsstrahlung radiation, which is typically emitted toward a subject of interest for treatment or imaging, and (2) characteristic radiation, which is a result of fluorescence from the target atoms and is typically emitted isotropically.

In imaging systems, for example, X-ray tubes are used in projection X-ray systems, fluoroscopy systems, tomosynthesis systems, mammography systems, and computed tomography (CT) systems as a source of X-ray radiation. In these implementations, images are produced by variations in contrast resulting from the different attenuation of X-rays by various materials in the sample or subject. Other techniques, such as diffraction-based phase contrast imaging, may produce images by variations in contrast resulting from differences in the refractive indices of different materials in the subject. Thus, diffraction-based imaging may be used to distinguish between materials having similar X-ray attenuation. While medical X-ray imaging systems typically utilize conventional X-ray tubes, some diffraction-based medical techniques use X-ray sources with higher flux than laboratory-based sources are typically able to provide.

For example, as noted above, during the operation of an X-ray source, the electron beam impacts and deposits energy into the source target, resulting in heat and X-ray radiation. The X-ray flux is, therefore, highly dependent upon the amount of energy that can be deposited into the source target by the electron beam within a given period of time. However, the relatively large amount of heat produced during operation, if not mitigated, can damage the X-ray source (e.g., melt the target). Accordingly, conventional X-ray sources are typically cooled by either rotating or actively cooling the target. However, when rotation is the means of avoiding overheating, the amount of deposited heat is limited by the rotation speed (RPM) and the life of the supporting bearings, this limits the amount of deposited heat and X-ray flux. This also increases the overall volume, and weight of the X-ray source systems. When the target is actively cooled, such cooling generally occurs far from the electron beam impact area, which in turn significantly limits the electron beam power that can be applied to the target. In both situations, the restricted heat removal ability of the cooling methods markedly lowers the overall flux of X-rays that are generated by the X-ray tube.

BRIEF DESCRIPTION

Certain embodiments commensurate in scope with the originally claimed subject matter are summarized below.

These embodiments are not intended to limit the scope of the claimed subject matter, but rather these embodiments are intended only to provide a brief summary of possible embodiments. Indeed, the invention may encompass a variety of forms that may be similar to or different from the embodiments set forth below.

In one embodiment, an X-ray source includes one or more electron emitters configured to emit one or more electron beams; one or more source targets configured to receive the one or more electron beams emitted by the one or more electron emitters and, as a result of receiving the one or more electron beams, to emit X-rays. Each source target includes: a first layer having one or more first materials; and a second layer in thermal communication with the first layer and having one or more second materials, wherein the first layer is positioned closer to the electron emitter than the second layer, the first material layer has a higher overall thermal conductivity than the second layer, and the second layer produces the majority of the X-rays emitted by the source target.

In another embodiment, an X-ray source includes: one or more electron emitters configured to emit one or more electron beams; one or more stationary source targets configured to receive the one or more electron beams produced by the one or more emitters and, as a result of receiving the one or more electron beams, to emit X-rays. Each source target includes: a target layer having one or more target materials; and an electron beam impact area at which the electron beam impinges on the target layer, and wherein the target layer includes a notch disposed about the electron beam impact area.

In a further embodiment, an X-ray source includes an emitter assembly having an emitter and one or more electron beam focusing elements. The emitter assembly is configured to emit and focus an electron beam such that the electron beam has an aspect ratio of at least 500:1 at a site of impact. The source also includes a source target configured to receive, at the site of impact, the electron beam and, as a result of receiving the electron beam, to emit X-rays and an X-ray window out of which the X-rays are emitted from the X-ray imaging source.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
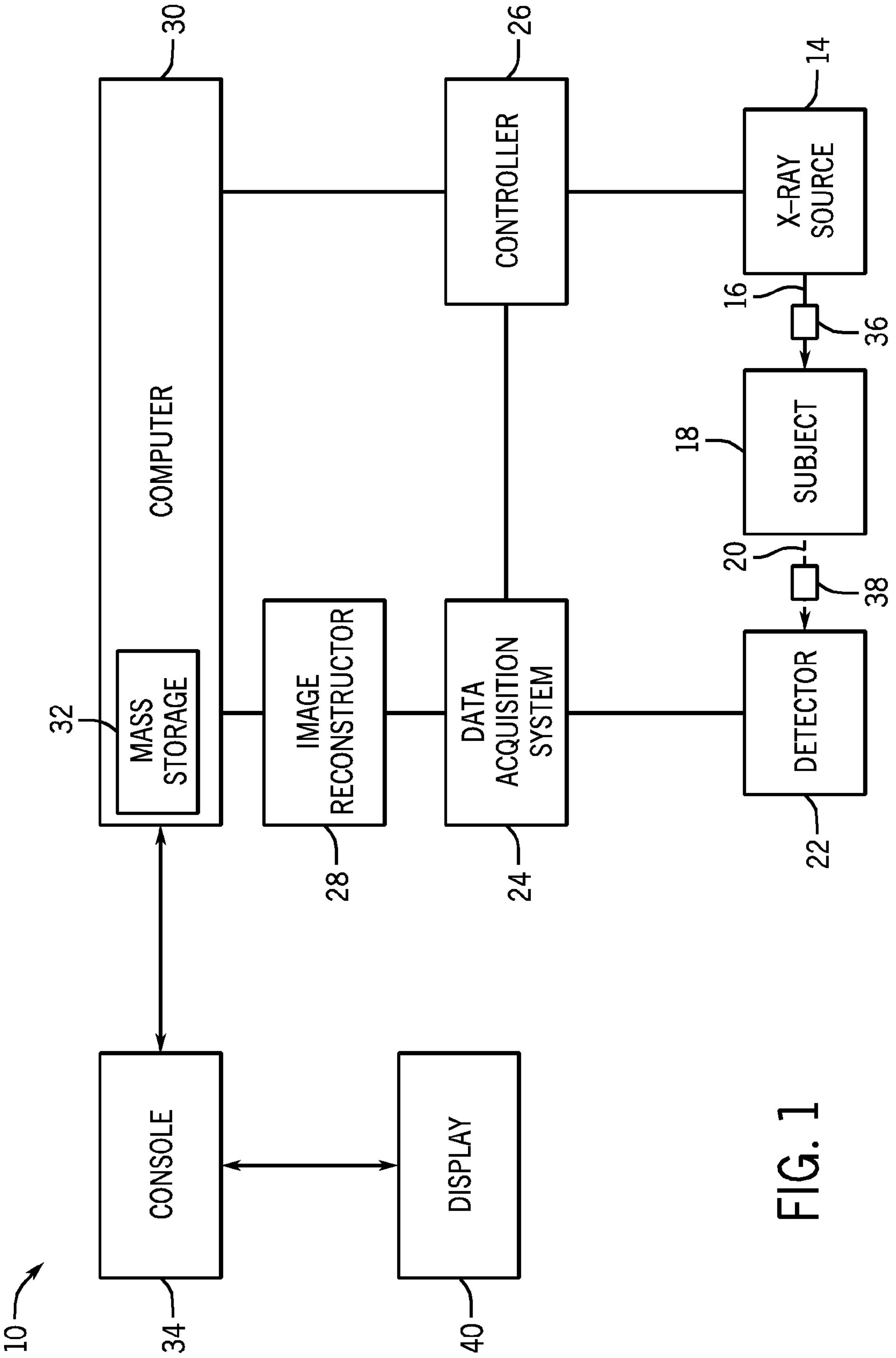
FIG. 1 is a block diagram of an X-ray imaging system incorporating an embodiment of the present disclosure.

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

As noted above, the X-ray flux produced by an X-ray source may depend on the energy and intensity of an electron beam deposited into the source's target. The energy deposited into the target produces, in addition to the X-ray flux, a large amount of heat. Accordingly, during the normal course of operation, a source target is capable of reaching temperatures that, if not tempered, can damage the target. Typically, the temperature rise is managed by either rotating or actively cooling the target. However, such cooling is macroscopic and does not occur immediately adjacent to the electron beam impact area, which in turn substantially limits the overall flux of X-rays produced by the source, potentially making the source unsuitable for certain applications, such as those requiring high X-ray flux densities. Accordingly, it would be desirable if the source could be operated in a substantially continuous basis in a manner that enables the output of high X-ray flux.

The present disclosure provides embodiments of systems including an X-ray source having features configured to reduce thermal buildup in the source. For example, certain of the embodiments disclosed herein include a multilayer source target having one or more layers disposed in thermal communication with a target layer. As discussed herein, a "target layer" is intended to denote a layer that produces the majority of X-rays when the multilayer structure receives an electron beam. The one or more layers that are in thermal communication with the target layer, in accordance with present embodiments, generally have a higher overall thermal conductivity than the target layer. The one or more layers may be disposed between a source of the electron beam and the target layer, or between an X-ray window and the target layer, or both. The one or more layers may generally be referred to as "heat-dissipating" or "heat-spreading" layers, as they are generally configured to dissipate or spread heat away from the target area impinged on by the electron beam to enable enhanced cooling efficiency.

The present disclosure also provides embodiments of an emitter assembly configured to emit and focus an electron beam. The electron beam may be focused in a manner that enables the electron beam to have an aspect ratio when impinging on the source target suitable for particular high flux applications. For example, the aspect ratio, measured by the ratio of orthogonal lines bisecting the width and length of the electron beam when impinging on the source target, may be at least 500:1, such as between 500:1 and 5000:1, between 500:1 and 2500:1, or between 750:1 and 1250:1. Using such an aspect ratio may enable the electron beam to deposit a relatively large amount of energy into a relatively small portion of the target layer, enabling both high flux and faster cooling. Such embodiments are discussed herein below.

Referring to FIG. 1, an X-ray imaging system 10 is shown as including an X-ray source 14 that projects a beam of X-rays 16 through a subject 18. It should be noted that while the imaging system 10 may be discussed in certain contexts, the X-ray imaging systems disclosed herein may be used in conjunction with any suitable type of imaging or any other X-ray implementation. For example, the system 10 may be part of a diffraction-based phase contrast imaging system, a fluoroscopy system, mammography system, angiography system, a standard radiographic imaging system, a computed tomography system, and/or a radiation therapy treatment system. Further, the system 10 may not only be applicable to medical imaging contexts, but also to various inspection systems for industrial or manufacturing quality control, luggage and/or package inspection, and so on. Accordingly, the subject 18 may be a laboratory sample, (e.g., tissue from a biopsy), a patient, luggage, cargo, nuclear fuel, or other material of interest.

The subject may, for example, attenuate or refract the incident X rays 16 and produce the projected X-ray radiation 20 impacts a detector 22, which is coupled to a data acquisition system 24. It should be noted that the detector 22, while depicted as a single unit, may include one or more detecting units operating independently or in conjunction with one another. The detector 22 senses the projected X-rays 20 that pass through the subject 18, and generates data representative of the attenuated radiation. The data acquisition system 24, depending on the nature of the data generated at the detector 22, converts the data to digital signals for subsequent processing. Depending on the application, each detector 22 produces an electrical signal that may represent the intensity and/or phase of each projected X-ray beam 20 as it passes through the subject 18.

An X-ray controller 26 may govern the operation of the X-ray source 14 and/or the data acquisition system 24. The controller 26 may provide power and timing signals to the X-ray source 14 to control the flux of the X-ray radiation 16, and to control or coordinate with the operation of other system features, such as cooling systems for the X-ray source, image analysis hardware, and so on. In embodiments where the system 10 is an imaging system, an image reconstructor 28 (e.g., hardware configured for reconstruction) may receive sampled and digitized X-ray data from the data acquisition system 24 and perform high-speed reconstruction to generate one or more images representative of different attenuation, differential refraction, or a combination thereof, of the subject 18. The images are applied as an input to a processor-based computer 30 that stores the image in a mass storage device 32.

The computer 30 also receives commands and scanning parameters from an operator via a console 34 that has some form of operator interface, such as a keyboard, mouse, voice activated controller, or any other suitable input apparatus. An associated display 40 allows the operator to observe images and other data from the computer 30. The computer 30 uses the operator-supplied commands and parameters to provide control signals and information to the data acquisition system 24 and the X-ray controller 26.

In certain embodiments, the X-ray imaging system 10 may also include certain features that enable the recording of phase information. In particular, in such embodiments, first and second optical elements 36, 38 may be positioned between the X-ray source 14 and the subject 18, and the subject 18 and the detector 22, respectively. The first and second optical elements 36, 38 may independently include any suitable optical element capable of enabling a phase image to be created by causing diffraction in the beam of X-rays 16 and the projected X-ray radiation 20. By way of non-limiting example, the first and second optical elements 36, 38 may include gratings, diffraction crystals, or a combination thereof.

Figure 2:
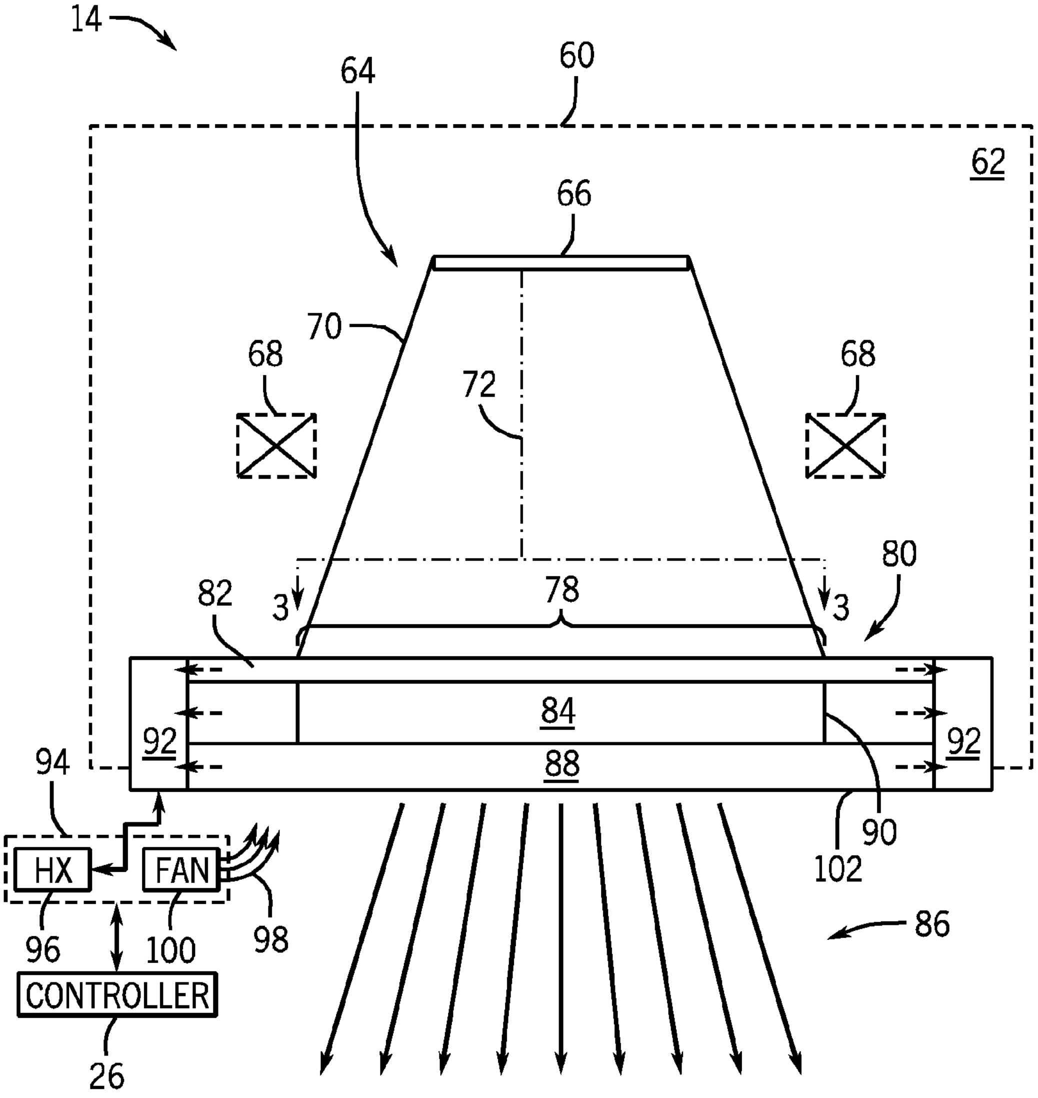
FIG. 2 is front view of the X-ray source of the system illustrated in FIG. 1.

Referring now to FIG. 2, an embodiment of the X-ray source 14 is shown diagrammatically in a front view. The illustrated X-ray source 14 includes an enclosure 60, which fully or partially defines a vacuum space 62 in which the X-ray producing features of the source 14 are disposed. In particular, an emitter assembly 64 including an electron emitter 66 and one or more beam focusing elements 68 are positioned within the vacuum space 62. The electron emitter 66 may be any suitable type, including a cold-cathode field emitter or a thermionic emitter, for generating a shaped electron beam 70. In accordance with present embodiments, the emitter 66 may be a flat filament, a wire (e.g., coiled) filament, a segmented filament, a V-shaped filament, a crystal, or any combination thereof. The source 14 may include any number of emitters 66.

As opposed to sources that use an electron beam that is generally circular in cross-section, one embodiment of the emitter assembly 64 emits and focuses an electron beam with a particular aspect ratio at a point of impact on the source target 80. The aspect ratio is measured as a cross-section of the beam 70, as depicted by section 3-3 orthogonal to an axis 72 of electron flow. In accordance with certain embodiments, the electron beam 70 may have a cross-section with a rectangle shape, a line shape, or an elliptical shape. The general cross-sectional shape of the electron beam 70 may be focused using the beam focusing elements 68, which may include features (e.g., inductive coils) configured to shape the beam 70 using one or more electric, electro-magnetic, or magnetic fields. In essence, these fields serve to shape and steer the electron beam 70.

Figure 3:
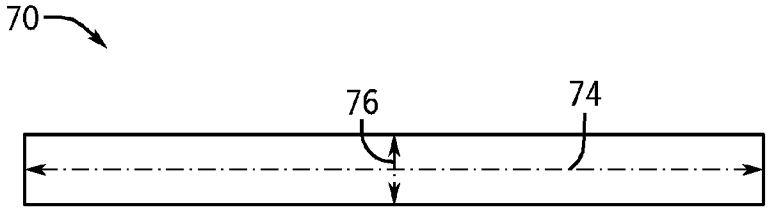
FIG. 3 is a side view of the X-ray source of FIG. 2 and incorporating an embodiment of the present disclosure.

FIG. 3 depicts an example of a cross-section of a generally rectangular beam at or near and parallel to section 3-3. In one embodiment, the cross-sectional shape of the electron beam 70 has a longer dimension along a major axis 74 (e.g., a length of the beam 70) and a shorter dimension along a minor axis 76 (e.g., a width of the beam 70). It should be understood that the scale of the cross-sectional shape may change along the axis 72 (FIG. 2) of electron flow. In particular, in certain embodiments, the electron beam 70 has a cross-sectional aspect ratio defined by the magnitude of the major axis 74 to the minor axis 76 of at least 500:1, such as between 500:1 and 5000:1, between 500:1 and 2500:1, or between 750:1 and 1250:1 at a point of impact or impingement on the target 80. By way of non-limiting example, the minor axis 76 may be approximately 10 microns in size, and the major axis 74 may be approximately 1 centimeter in size.

Returning to FIG. 2, as depicted, the point of impact for the shaped electron beam 70 corresponds to an impact position 78 on a source target 80 of the source 14. The source target 80 may be stationary or rotary, depending upon the particular implementation and desired mode of operation. For example, in embodiments where the X-ray source 14 is a reflective type, the source target may be rotary. In embodiments where the X-ray source 14 is a transmission type, the source target 80 may be stationary or rotary.

In the illustrated embodiment, the source target 80 may be a multilayer including a top heat-spreading layer 82, which is first impinged by the electron beam 70, a target layer 84, which produces the majority of X-rays 86 emitted by the source 14 when impinged by the electron beam 70, and an X-ray window 88 out of which the X-rays 86 are emitted. In other embodiments, the source target 80 may include more or fewer layers, depending upon the particular implementation. The particular configuration and materials of the multilayer source target 80 are discussed in detail below with respect to FIG. 4, with other embodiments of the multilayer source target 80 being discussed with respect to FIGS. 5-10. In a general sense, the configuration of the multilayer source target 80 enables thermal conductance away from the position 78 (FIG. 2), and away from an impact area 90 of the target layer 84.

It should be noted that while certain embodiments are discussed in the context of including an emitter that emits a beam toward one focal spot on the target layer 84, that all such embodiments may include, additionally or alternatively, a smaller electron beam emitter that can be raster scanned using electron focusing optics. In other words, the smaller electron beam emitter may be scanned over various regions of the target layer 84, such as scanned over one or more notches, vias, or channels, or over various flat regions, regions having varying thickness, regions having different layer configurations, and so forth.

In the illustrated embodiment, the thermal energy conducted away from the impact area 90 may be directed toward a cooling jacket 92 configured to circulate a cooling fluid (e.g., water, ethylene glycol) or gas about at least a portion of the source target 80. The cooling fluid may be provided by a cooling system 94, which is configured to provide active cooling of the source 14 and, more specifically, the source target 80. The cooling system 94 may include a heat exchanger 96 configured to reject heat from the cooling fluid or gas as it is recycled through the system 94. Additionally or alternatively, the cooling system 94 may flow cool air 98 (e.g., from a fan 100) along an outer perimeter 102 of the window 88. The operation of the cooling system 94 may be controlled, at least in part, by the controller 26. For example, during the course of operation, the cooling system 94 of FIG. 2 may adjust the flow of the cooling fluid through the jacket 92 in response to variations in the electron beam 70, such as variations in the energy and/or intensity of the beam 70.

Figure 4:
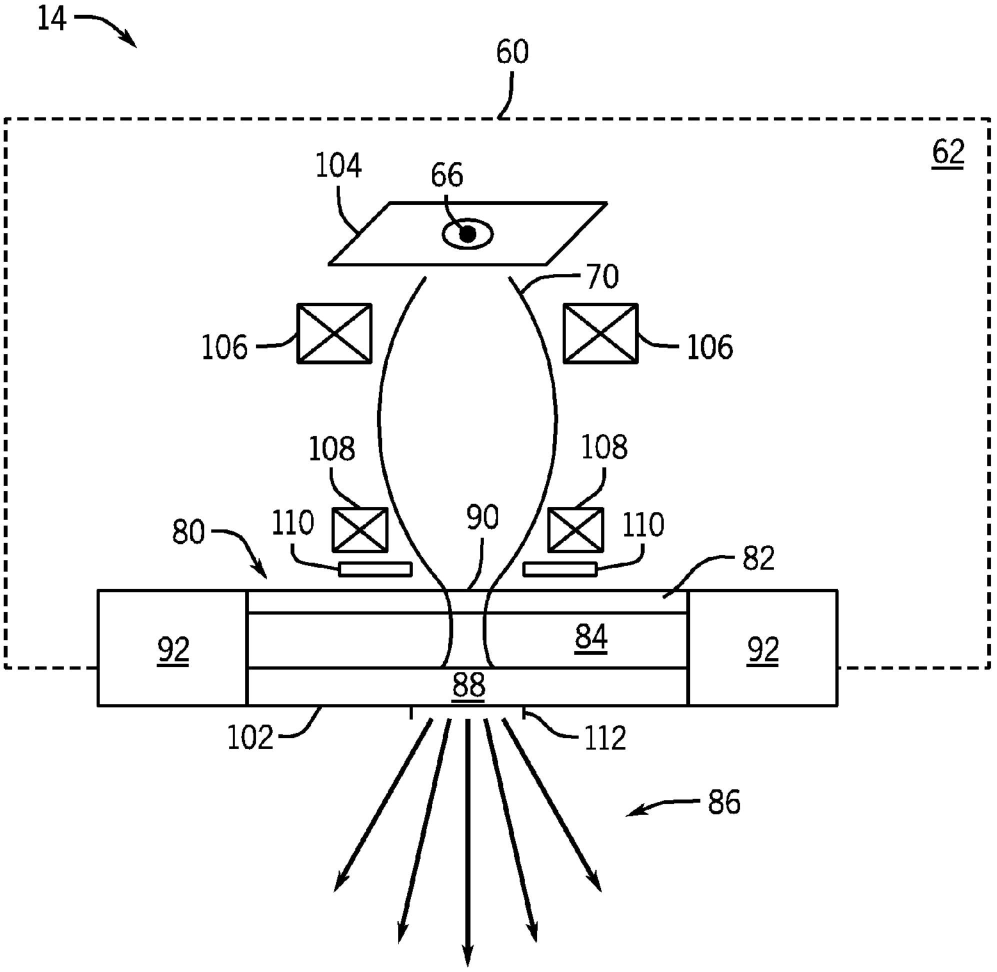
FIG. 4 is a side view of the X-ray source of FIG. 2 incorporating an embodiment of the present disclosure.

As noted above, the electron impact area 90 may define a particular shape, thickness, or aspect ratio on the target 80 to achieve particular characteristics of the emitted X-rays 86. FIG. 4 is a view of the X-ray source 14 of FIG. 2 along the major axis 74 of the electron beam 70 of FIG. 3. As depicted, the X-ray beam 86 produced by the source target 80 fans out from the target 80. That is, the emitted X-ray beam 86, while diverging, originated from the particular shaped impact area generated by the electron beam 70, i.e., a line shape defined by a particular line thickness or a particular aspect ratio. In all imaging applications that require ray tracing back to the original x-ray generation point (e.g., CT, phase contrast imaging), the size and shape of the x-ray generation point may be critical to determining the resolution of the image. In certain embodiments, the electron beam 70 at the electron impact area 90 on the target 80 may be characterized by a particular aspect ratio or ratio of a major axis to a minor axis, e.g., at least 500:1, 750:1, or 1000:1, or between 500:1 and 5000:1, between 500:1 and 2500:1, or between 750:1 and 1250:1. The electron beam impact area 90 on the target 80 may also be characterized by a thickness dimension of a line. For example, the line thickness of a line source (e.g., the dimension 76 in FIG. 3) may be between approximately 1 micron and 5 mm, or less than 100 microns for microfocus sources, or less than 1 micron for nano-focus sources. This thickness may determine the resolution of the imaging system along one dimension.

As discussed with respect to FIG. 2, the X-ray source 14 includes a series of electron beam focusing elements 68, which are each configured to produce an electric or magnetic field or combination thereof so as to affect the shape of the electron beam 70. These elements may include a first element 104 that extracts electrons from the emitter 66, and a second and third set of elements 106 and 108, respectively, that collectively focus the extracted electrons to produce the electron beam 70 at a desired shape (e.g., into the aspect ratios set forth above) on the target 80.

The emitted X-ray beam 86 has a particular size and shape that is approximately related to the size and shape of the electron beam 70 when incident on the target layer 84. Accordingly, the X-ray beam 86 exits the target 80 from an X-ray emission area 112 that may be predicted based on the size of the impact area 90. As discussed below with respect to FIG. 11, the size and shape of the X-ray beam 86 may be adjusted by a series of beam apertures and/or focusing elements (e.g., 200 in FIG. 11) disposed outside of the enclosure 60.

As noted, while the depicted embodiments show a transmission-type arrangement (e.g., with the X-ray beam emitted from an opposing surface of the target) of the electron transmitter and the target, the techniques provided herein may also be implemented in a reflectance-type arrangement. For example, while the illustrated embodiment depicts the main symmetry axis of the x-ray beam 86 as being orthogonal to the source target 80 (e.g., axis 72 is substantially perpendicular to the target 80), in a reflectance arrangement, the angle at which X rays from the target are viewed is frequently acutely angled relative to the perpendicular to the target. This effectively increases the x-ray density in the output beam, while allowing a much larger thermal spot on the target, thereby decreasing the thermal loading of the target.

Alternatively, the electron beam direction 72 can make an acute angle with the normal to the target in a transmission x-ray source. The thickness of the target material may be reduced from the case where the electron beam direction is parallel to the target normal. In the acute angle case, the target may be made thin enough that the length of the oblique electron path through the target may be similar to that of the electron path in the parallel case. By reducing the target thickness in such a way, the self-absorption of X-rays within the target may be reduced and the X-ray flux density may be increased at specific angles, for example perpendicular to the target.

As noted above, the source target 80 may have one or a plurality of layers including at least the top heat spreader 82, the target layer 84, and the X-ray window 88, though these layers may be combined together or other layers may also be included, as discussed below. As generally noted above, the thermal conductivity of the source target 80 may enable an increase in the density of the electron beam 70 on the target 80 without detrimentally affecting the target 80. Indeed, heat dissipating materials, heat-spreading materials, or other microstructural features may be included in the design of the target 80, which collectively enable a relatively higher electron beam flux density on the target 80, resulting in a higher flux density in the X-ray beam 86.

In the illustrated embodiment, the top heat spreader 82 (e.g., a first layer) may include one or more materials (e.g., one or more first materials) that impart a higher overall thermal conductivity to the top heat spreader 82 than the target layer 84, which may include a metal or composite, such as tungsten, molybdenum, europium, samarium, copper, tungsten-rhenium alloy or bilayer, or any other material or combinations of materials that contribute to Bremsstrahlung (i.e., deceleration or braking radiation) when bombarded with electrons. In addition, the top heat spreader 82 may have a higher overall melting point than the target layer 84. Generally, the top heat-spreading layer 82 is configured to conduct heat in a direction away from the position 78 (FIG. 2) or position 90 (FIG. 4), such as laterally away. The top heat-spreading layer 82 may have a relatively high lateral thermal conductivity, i.e., conductivity in a direction approximately parallel to the axis 76 (FIG. 3), have a relatively high thickness conductivity, i.e., conductivity in a direction substantially aligned with the axis 72, or both. In accordance with present embodiments, the overall lateral and/or thickness thermal conductivity of the top heat-spreading layer 82 (and other heat-spreading layers disclosed herein) may be higher than the overall corresponding thermal conductivity of the target layer 84. By way of non-limiting example, the top heat-spreading layer 82 may include carbon-based materials including but not limited to highly ordered pyrolytic graphite (HOPG), diamond, sputtered carbon, diamond-like carbon (DLC), and/or metal-based materials such as beryllium oxide, silicon carbide, aluminum nitride, silicon nitride, alumina, copper-molybdenum, aluminum silicon carbide, oxygen-free high thermal conductivity copper (OFHC), or any combination thereof. Alloyed materials such as silver-diamond may also be used. In some embodiments, the top heat-spreading layer 82 may include HOPG, diamond, or a combination thereof, and the target layer 84 may include tungsten. Example heat-spreading materials that may be incorporated into any one or a combination of the heat-spreading layers disclosed herein are provided in Table 1 below, which provides the electrical nature of each material, along with composition, thermal conductivity, coefficient of thermal expansion (CTE), density, and melting point.

TABLE 1

Example Heat Spreader Materials

| Material | Function | Electrical | Composition | Thermal Conductivity W/m-K | CTE ppm/K | Density g/cm$^3$ | Melting point ° C. |
|---|---|---|---|---|---|---|---|
| Diamond | Heat spreader | Insulator | Polycrystalline diamond | 1200 | 1.5 | 3.5 | 3550 |
| Beryllium oxide | Heat spreader | Insulator | BeO | 250 | 7.5 | 2.9 | 2578 |
| CVD SiC | Heat spreader | Insulator | SiC | 250 | 2.4 | 3.2 | 2830 |
| Aluminum nitride | Heat spreader | Insulator | AlN | 170 | 4.3 | 3.3 | 2200 |
| Alumina | subamount | Insulator | $Al_2O_3$ | 30 | 7.3 | 3.9 | 2072 |
| Highly oriented pyrolytic graphite | Heat spreader | Conductor | C | 1700 | 0.5 | 2.25 | NA |
| Cu—Mo | Heat spreader | Conductor | Cu—Mo | 400 | 7 | 9-10 | 1100 |
| Ag-Diamond | Heat spreader | Conductor | Ag-Diamond | 650 | <6 | 6-6.2 | 961-3550 |
| AlSiC | Heat spreader | Conductor | AlSiC | 180 | 6.5-9 | 3 | 600 |
| OFHC | Heat spreader | Conductor | Cu | 390 | 17 | 8.9 | 1350 |

In embodiments where the X-ray source 14 is a transmission X-ray source, the X-ray window 88 may be a part of the source target 80, or may be in thermal communication with the source target 80. In the illustrated embodiment, the X-ray window 88 is in thermal communication with the target layer 84. In accordance with present embodiments, the X-ray window 88 may have a relatively high thickness thermal conductivity (i.e., aligned with the axis 72) to enable the X-ray window 88 to dissipate or otherwise conduct thermal energy to its outer perimeter 102, where heat rejection via the cooling system 94 may be facilitated. The X-ray window 88 may have a higher overall thermal conductivity than the target layer 84. The greater the distance from the initial electron impact point, the lower the temperature of the target, resulting in the ability to use x-ray windows having melting points lower than that of the target layer 84. By way of non-limiting example, the window 88 may be beryllium (Be).

It should be noted that the source target 80 may include as little as one layer, but is not limited to a particular number of layers. For example, in certain embodiments, the target layer 84 may act as the X-ray window 88 by separating the vacuum space 62 from the ambient environment around the X-ray source 14, and by serving as the window through which X-rays are emitted. Similarly, in some embodiments, the source target 80 may only include the top heat spreader 82 and the X-ray target 84. The source target 80 may also include one or more heat-spreading layers in addition to the top heat spreader 82.

The source target 80 may be fabricated using any suitable technique, such as suitable semiconductor manufacturing techniques including vapor deposition such as chemical vapor deposition (CVD), sputtering, atomic layer deposition, chemical plating, ion implantation, or additive manufacturing, and so on. However, due to the variance in materials utilized to achieve the particular thermal conductivity desired for the source target 80, certain transition materials may be utilized between each layer to facilitate thermal and mechanical bridging of the layers. For example, carbon-based materials may be thermally conductive via phonon travel (i.e., elastic vibrations in the material's lattice), while metallic materials may be thermally conductive via the metal's loosely bound valence electrons. These dissimilar modes of thermal conductance can sometimes prevent suitable thermal conductance between layers. In addition, materials having dissimilar coefficients of thermal expansion may not necessarily be compatible with one another. Accordingly, in such situations, it may be desirable to provide a transition material that prevents thermal resistance between the layers of the source target 80 while also allowing for thermal expansion. Example embodiments of such configurations are discussed below with respect to FIGS. 5 and 6.

Figure 5:
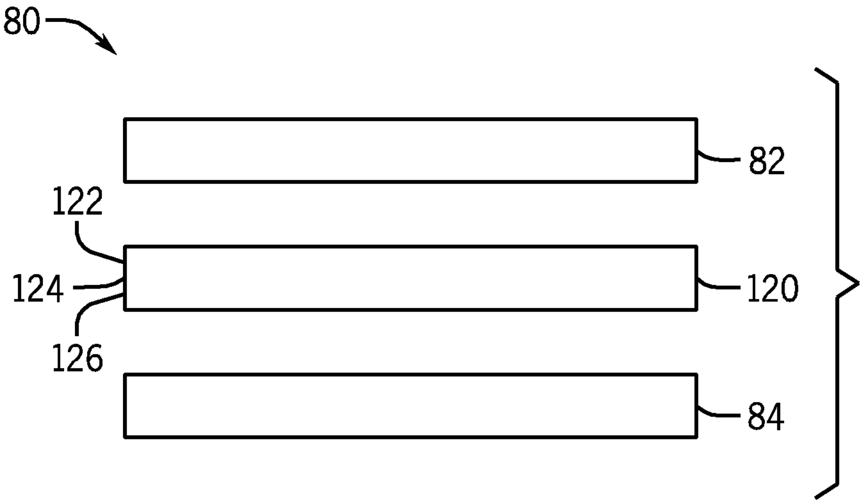
FIG. 5 is a schematic view of an arrangement of various layers of a multilayer source target of the X-ray source of FIG. 2 incorporating an embodiment of the present disclosure.
Figure 6:
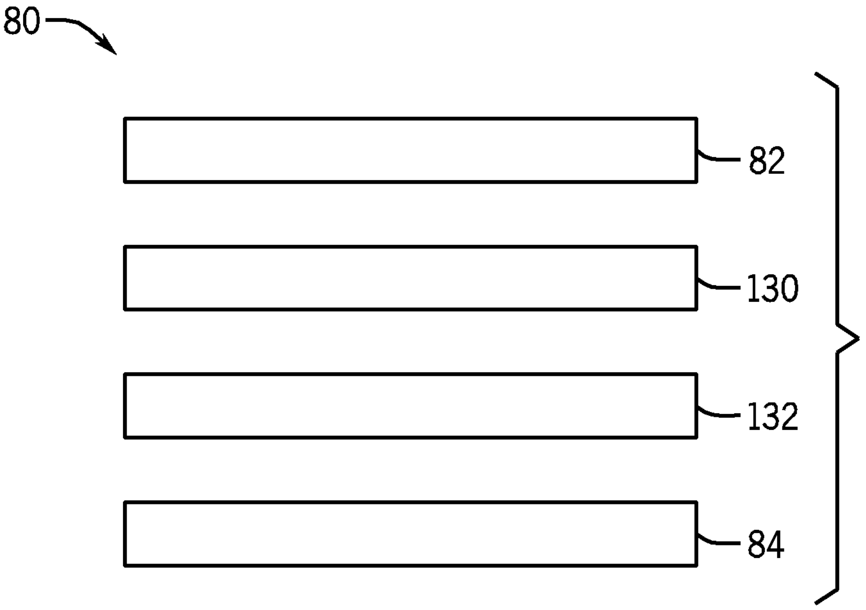
FIG. 6 is a schematic view of an arrangement of various layers of a multilayer source target of the X-ray source of FIG. 2 incorporating an embodiment of the present disclosure.

It should be noted that for the embodiments depicted in FIGS. 5 and 6, the layers are shown as exploded away from one another to facilitate discussion. However, in an actual implementation, the layers depicted in FIGS. 5 and 6, as well as all of the multilayer embodiments disclosed herein, may be formed such that there are no gaps (e.g., air or gaseous gaps) in between each layer. Indeed, it may be desirable to avoid such gaps since air or other gases generally reduce thermal conductivity and, therefore, thermal dissipation away from areas that may experience relatively high levels of thermal energy.

FIG. 5 depicts an embodiment of the source target 80 where the top heat spreader 82 (e.g., a first layer) and the target layer 84 (e.g., a second layer) are bridged by a transition layer 120 (e.g., an additional layer or a third layer). However, it should be appreciated that the embodiment of FIG. 5 may be equally applicable to the bridging of any dissimilar layers of the source target 80, such as the target layer 84 and a bottom heat spreader, which is described in detail below with respect to FIG. 7. In the depicted embodiment, the one or more materials contained within the top heat spreader 82 do not have a desired degree of compatibility (e.g., mechanical, thermal, chemical, electrical) with the one or more materials of the target layer 84. By way of non-limiting example, such a situation may occur where the top heat spreader 82 includes a carbon-based material, such as HOPG, diamond, or sputtered carbon, and the target layer includes one or more materials that do not readily form carbides (e.g., do not have a desired degree of chemical affinity for the carbon-based materials), such as copper.

To bridge the top heat-spreading layer 82 and the target layer 84, the transition layer 120 includes, by way of example, a compositional gradient. The compositional gradient serves to gradually transition from at least one material 122 of the one or more materials of the top heat-spreading layer 82 and into one or more transition materials 124. The compositional gradient also serves to gradually transition from the one or more transition materials 124 and into at least one material 126 of the target layer 84. In one embodiment, the one or more transition materials 124 may be selected so as to prevent high thermal resistance between the top heat-spreading layer 82 and the target layer 84, and also to enable a degree of mechanical deformability to account for the coefficients of thermal expansion of the top heat-spreading layer 82 and the target layer 84. In a general sense, the transition layer 120 enables thermal communication between the top heat-spreading layer 82 and the target layer 84, such that the top heat-spreading layer 82 and the target layer 84, even though they are separated by one or more layers, may nevertheless be in thermal communication. It should be noted, however, that embodiments where the heat-spreading layers and the target layer 84 are in direct thermal communication (i.e., are directly and physically coupled to one another) are also presently contemplated.

Returning to the example noted above where the target layer 84 includes copper and the top heat-spreading layer 82 includes a carbon-based material, the embodiment of the source target 80 depicted in FIG. 5 may be produced by any technique for layer assembly, including CVD, sputtering, and the like, with the transition layer 120 including molybdenum as one of the one or more transition materials 124. For example, beginning with the top heat-spreading layer 82, which may be HOPG or diamond, the compositional gradient of the transition layer 120 may be produced by first sputtering carbon and/or molybdenum carbide onto the top heat-spreading layer 82. In one embodiment, the carbon and molybdenum and/or molybdenum carbide may be co-sputtered. Molybdenum, copper, or both, may then be sputtered/co-sputtered onto the resulting molybdenum/molybdenum carbide surface to transition into the target layer 84.

While it may be desirable to provide the transition layer 120 as a single layer that is capable of accommodating the thermal coefficients of expansion and preventing thermal bonding resistance between the top heat-spreading layer 82 and the target layer 84, in other embodiments, this may be accomplished using two or more transition layers, as depicted in FIG. 6. In particular, FIG. 6 depicts an embodiment of the source target 80 having a first transition layer 130 disposed directly adjacent to the top heat-spreading layer 82 (or other heat-spreading layer), and a second transition layer 132 disposed between the first transition layer 130 and the target layer 84. In the illustrated embodiment, the second transition layer 132 is disposed directly adjacent to the target layer 84, though in some embodiments there may be other layers disposed between the second transition layer 132 and the target layer 84.

While any configuration for the first and second transition layers 130, 132 is presently contemplated, it may be desirable for the first transition layer 130 to account for the coefficient of thermal expansion of the top heat-spreading layer 82 and the target layer 84, while the second transition layer 132 is configured to prevent thermal bonding resistance between the top heat-spreading layer 82 and the target layer 84. For example, the first transition layer 130 may be chosen to have a coefficient of thermal expansion value that is between that of the top heat-spreading layer 82 and the target layer 84, and the second transition layer 132 may be chosen to have a thermal conductivity that is between that of the top heat-spreading layer 82 and the target layer 84. Further, it should be noted that the first and second transition layers 130 and 132 may include materials having similar modes of thermal conductivity. For example, in embodiments where the top heat-spreading layer 82 conducts thermal energy by phonon travel, the first transition layer 130 may include materials whose main mode of thermal conductivity is also phonon travel but may also include materials whose main mode of thermal conductivity is via metallic valence electrons. Similarly, in embodiments where the target layer 84 conducts thermal energy via electrons, the second transition layer 132 may include materials whose main mode of thermal conductivity is also via electrons but may also include materials whose main mode of thermal conductivity is via phonons.

By way of non-limiting example, the top heat-spreading layer 82 may be a carbon based material such as HOPG, diamond, diamond-like carbon (DLC), graphite, or any combination thereof, and the target layer 84 may be tungsten or molybdenum. In this example, the first and second transition layers 130, 132 may independently include copper, silver, silver-diamond, tungsten, tungsten carbide, molybdenum, molybdenum carbide, or any combination thereof.

Figure 7:
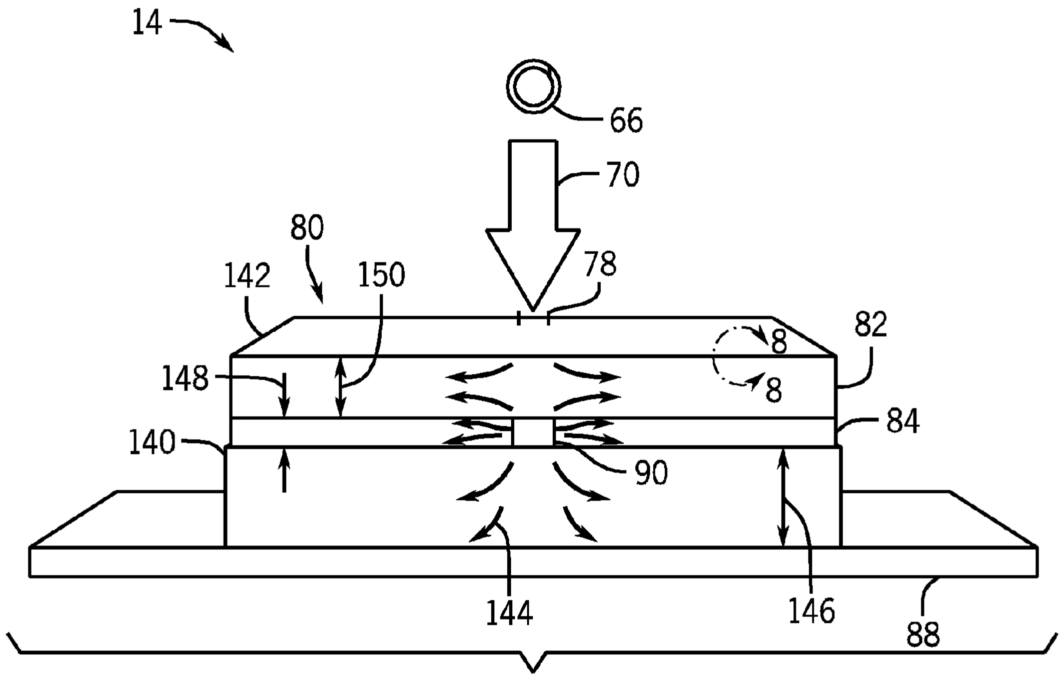
FIG. 7 is a schematic view of an embodiment of the X-ray source of FIG. 1 having a multilayer source target with a top heat-spreading layer, a target layer, a bottom heat-spreading layer, and an X-ray window, in accordance with an embodiment of the present disclosure.
Figure 8:
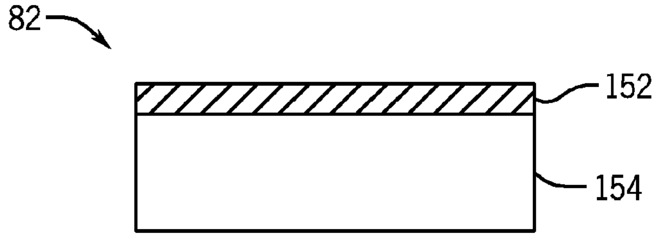
FIG. 8 is an expanded view of the top heat-spreading layer of FIG. 7 in accordance with an embodiment of the present disclosure.

Using any one or a combination of these approaches, embodiments of the source target 80 having any number and combination of layers may be produced. For example, in FIG. 7 is depicted diagrammatically an embodiment of the source target 80 having the top heat-spreading layer 82, the target layer 84, and a bottom heat-spreading layer 140. A simplified schematic of the electron emitter 66 and the electron beam 70 is also depicted. As illustrated, the electron beam 70 impinges on the top heat-spreading layer 82 on a top surface 142 (e.g., a first side of the source target 80), traverses the layer 82, and impinges on the target layer 84, which produces the X-ray beam 86 (FIGS. 2 and 3), which exits the source from the X-ray window 88 (e.g., a second side of the source target 80 opposite the first side). As noted above, the electron beam 70 deposits a relatively large amount of energy into the target layer 84 and produces thermal energy in addition to the X-rays. The thermal energy, as illustrated by arrows 144, is conducted or "spread" away from the area 90 by the top heat-spreading layer 82 and the bottom heat-spreading layer 140. As the arrows 144 depict, the direction of thermal conduction may be laterally away from the electron beam impact area 90, as well as longitudinally away from the electron beam impact area 90. The bottom heat spreader 140 may have a higher lateral and/or latitudinal conductivity than the target layer 84.

To enable the bottom heat-spreading layer 140 to conduct thermal energy in this manner, the bottom heat-spreading layer 140 may include any one or a combination of the materials described above for the top heat-spreading layer 82, such as the materials set forth in Table 1. However, it should be noted that the bottom heat-spreading layer 140 material may be the same or different than that of the top heat-spreading layer 82. Thus, the bottom heat-spreading layer 140, independent of the top heat-spreading layer 82, may include HOPG, diamond, sputtered carbon, DLC, or the like, and/or metal-based materials such as beryllium oxide, silicon carbide, aluminum nitride, silicon nitride, alumina, copper-molybdenum, aluminum silicon carbide, OFHC, or any combination thereof. Additionally, the bottom heat-spreading layer 140 may be provided as a part of the source target 80 using the approaches described above with respect to FIGS. 5 and 6, or any other suitable technique.

As noted, the bottom heat-spreading layer 140 may desirably conduct thermal energy longitudinally and laterally away from the electron beam impact area 90. Indeed, in certain embodiments, the overall thermal conductivity of the bottom heat-spreading layer 140 may be sufficient to draw thermal energy to the X-ray window 88 which, as noted above, may have a relatively high thickness (i.e., longitudinal) conductivity so as to dissipate the thermal energy to the outside environment.

In some embodiments, the bottom heat-spreading layer 140 may incorporate the X-ray window 88. That is, in such embodiments, the bottom heat-spreading layer 140 may include one or more materials that are suitable to act as an X-ray window material. Accordingly, the bottom heat-spreading layer 140 may, in these embodiments, include diamond, beryllium oxide, or other window materials having a relatively high thermal conductivity. However, it should be noted that the bottom heat-spreading layer 140 may, in some embodiments, have a thickness that is greater than a traditional X-ray window to enable the bottom heat-spreading layer 140 to not only serve as the X-ray window 88, but also to enable the bottom heat-spreading layer 140 to serve as a heat sink for the target layer 84. In certain embodiments, the bottom heat-spreading layer 140 may have a thickness 146 that is greater than or equal to a thickness 148 of the target layer 84. The top heat-spreading layer 82 may also have a thickness 150 that is greater than or equal to the thickness 148 of the target layer 84 to enable the top heat-spreading layer to serve as a heat sink for the target layer 84.

In some embodiments, the source target 80 may utilize a particular combination of materials to allow a higher electron beam flux to impact it, thereby achieving a higher X-ray flux. Indeed, it is now recognized that particular material combinations may be desirable to achieve certain levels of X-ray flux. By way of example, it is now recognized that the combination of diamond for the top heat-spreading layer 82, tungsten for the target layer 84, and diamond for the bottom heat-spreading layer 140 and/or X-ray window 88 may enable an increase in the X-ray beam flux produced by the X-ray source by approximately one order of magnitude.

It will be appreciated upon reference to FIG. 7 that the top heat-spreading layer 82 is the first layer impinged by the electron beam 70. Although the electron beam 70 may traverse the top heat-spreading layer 82 to deposit energy into the target layer 84, the electron beam may also deposit energy into the top heat-spreading layer 82. In some instances, such as in embodiments where the top heat-spreading layer 82 includes an electrically non-conducting or semiconducting material, the absorbed electron beam may negatively charge the top heat-spreading layer 82, repelling subsequent electrons in the electron beam, thereby reducing the electron beam intensity at the target layer 84. Accordingly, as depicted by the expanded view of FIG. 8, which is taken within sight line 8-8 of FIG. 7, the top heat-spreading layer 82 may include an electrically conductive (e.g., metallic) coating 152 deposited on an underlying electrically non-conducting or semiconducting material layer 154.

It should be noted that the electrically conductive coating 152 may generally have any thickness—including thicknesses that are substantially equal to or greater than the thicknesses of other source target layers. However, in some embodiments, the thickness of the metallic coating 152 may be significantly smaller than the thickness of the other source target layers. Indeed, the material and thickness of the conductive coating 152 may be such that minimal electron beam energy is lost in the coating 152 and substantially no X-rays or an insignificant amount of X-rays are produced in the coating 152, thereby substantially not affecting the intended operation of the X-ray source 14. By way of example, the conductive coating 152 may include copper (Cu), aluminum (Al), or any combination thereof. In one embodiment, the Cu and Al thicknesses would be as thin as 1 nm and as thick as 1 μm.

In addition to or in lieu of certain of the layers disclosed herein, the source target 80 may include one or more microstructural features configured to enable enhanced thermal energy dissipation, which may ultimately enable a higher electron beam flux and a concomitant increase in X-ray beam flux. FIGS. 9-12 depict example embodiments of such features. In particular, FIGS. 9-14 diagrammatically depict various portions of the X-ray source 14 including the emitter 66, which is configured to emit the electron beam 70, and varying embodiments of the source target 80 in which microstructural features are formed into one or more layers thereof.

Figure 9:
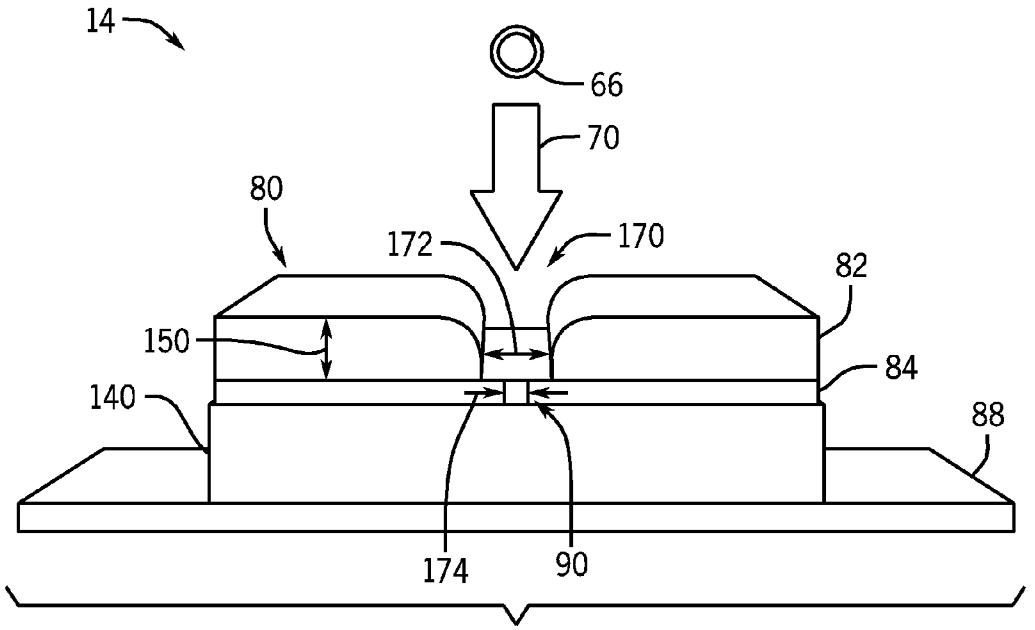
FIG. 9 is a schematic view of an embodiment of the X-ray source of FIG. 1 having a multilayer source target with a microstructured top heat-spreading layer, a target layer, a bottom heat-spreading layer, and an X-ray window, in accordance with an embodiment of the present disclosure.

FIG. 9 depicts an embodiment of the source target 80 in which the top heat-spreading layer 82 includes a via or channel 170. It should be noted that the top heat-spreading layer 82 may include one or more such vias or channels. The top heat-spreading layer 82, having the via or channel 170, may act as a more efficient heat sink due to the reduced electron beam energy loss in the top heat spreader 82 and the close proximity of the top heat spreader 82 to the electron beam impact point 90. The vias, notches, channels, or other similar features disclosed herein may be formed using any suitable technique, including but not limited to semiconductor manufacturing techniques such as laser cutting, photolithography, masks, deposition, and so forth.

The via or channel 170 may have any suitable geometry, including any suitable size and/or shape. In certain embodiments, the particular geometry of the via or channel 170 may depend on the size and/or shape of the electron beam 70 and, more specifically, on the geometry of the electron beam impact area 90. For example, in embodiments where the electron beam 70 has an extreme aspect ratio (e.g., between 500:1 and 5000:1 as noted above) and is linear or rectangular in shape, the via or channel 170 may have a similar shape. That is, the via or channel 170 may be a rectangular channel similar in shape to the geometry provided in FIG. 3. However, it should be noted that a width 172 of the channel 170 may be substantially the same size as the minor axis 76 (FIG. 3) of the electron beam 70, or may be larger (e.g., between approximately 0% and 100%, such as between approximately 5% and 100% larger), or may be smaller (e.g., between approximately 0% and 100% of the electron beam width 172, such as between approximately 1% and 99% smaller). The length of the via or channel 170 may be approximately equal to or larger than (e.g., between approximately 0% and 100%, such as between approximately 5% and 100% larger than) the major axis 74 (FIG. 3) of the electron beam 70. Additionally or alternatively, the size of the channel 170 may be substantially the same size, smaller, or larger than the electron beam impact area 90. For example, the width of the channel 170 may be the same size, smaller, or larger than a width 174 of the electron beam impact area 90. Indeed, this may be the case for all via or channels discussed herein, such as those discussed with respect to FIGS. 10-12. In one embodiment, the channel 170 may span the entire length of the top heat-spreading layer 82.

Similarly, in embodiments where the electron beam 70 has a circular or elliptical cross-section, the electron beam impact area 90 will have a correspondingly circular or elliptical geometry. Thus, the via or channel 170 may be a via having a particular radius that is substantially equal to the radius of the electron beam impact area, and may be larger than the radius of the electron beam impact area (e.g., between approximately 1% and 100% larger). The via or channel 170 may also have a particular radius that is smaller than the radius of the electron beam impact in situations, which can be used to reduce, for example, non-uniformities in the electron beam.

Figure 10:
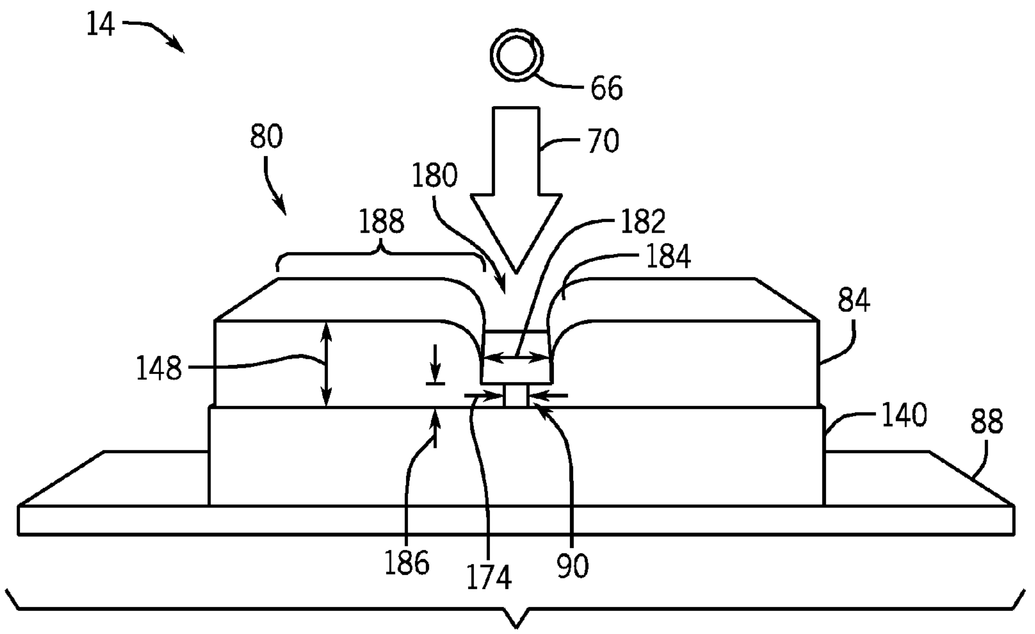
FIG. 10 is a schematic view of an embodiment of the X-ray source of FIG. 1 having a multilayer source target with a microstructured target layer, a bottom heat-spreading layer, and an X-ray window, in accordance with an embodiment of the present disclosure.
Figure 11:
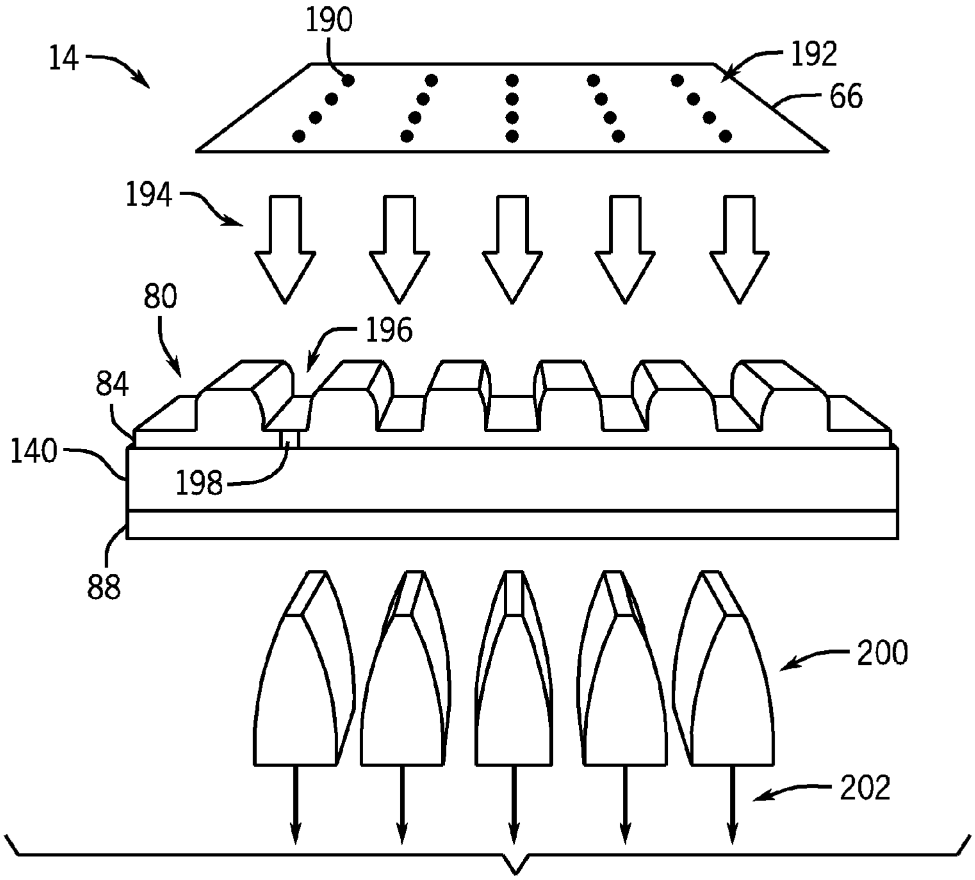
FIG. 11 is a schematic view of an embodiment of the X-ray source of FIG. 1 having a plurality of emitters, and a multilayer source target with a microstructured target layer, a bottom heat-spreading layer, and an X-ray window, in accordance with an embodiment of the present disclosure.
Figure 12:
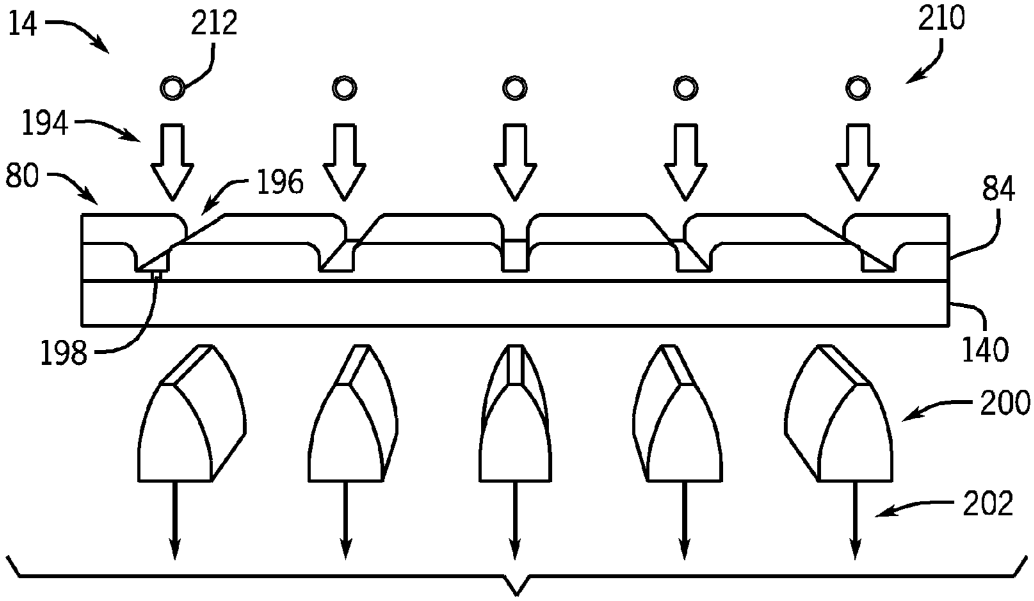
FIG. 12 is a schematic view of an embodiment of the X-ray source of FIG. 1 having a plurality of emitters and multilayer source target with a microstructured target layer and a bottom heat-spreading layer that serves as an X-ray window, in accordance with an embodiment of the present disclosure.

While the via or channel 170 is illustrated in FIG. 9 as passing through the entirety of the thickness 150 of the top heat-spreading layer 82, as discussed herein, a via or channel is not intended to denote that the microstructure defining the via or channel is formed through the entire thickness of a particular layer. Rather, the via or channel may generally define a structure that may pass fully through a thickness of a particular layer, or may only pass through a portion of a particular layer, such that the layer includes a first thickness outside of the via or channel, and a second, non-zero thickness within the via or channel. In other words, the via or channel may be a notch. Embodiments of notches in the target 84 are depicted in FIGS. 10-12. Further, the vias or channels are not limited to any particular geometry-they may have circular, semi-circular, elliptical, rectangular, triangular, square, or similar cross-sectional geometries, and these cross-sectional geometries may be taken in any direction, such as orthogonal to a plane defined by the particular layer, or substantially aligned with the plane defined by the layer. Accordingly, it should be appreciated that the use of the terms "via," "channel," and "notch" are not intended to be limited to any particular cross-sectional geometry. Rather, these terms are intended to encompass all suitable geometries that result in the properties disclosed herein.

FIG. 10 illustrates the X-ray source 14 as including an embodiment of the source target 80 with a notch 180 formed into the target layer 84. In this embodiment, the source target 80 does not include the top heat-spreading layer 82, although in certain embodiments the top heat-spreading layer 82 may be present, either with or without a microstructure corresponding to the notch 180 formed into the target layer 84. Further, the target layer 84 may include one or more such notches 180.

The notch 180, as depicted, has a size that may be smaller than the electron beam cross-section to reduce the size of the electron beam impact area to a specific desired dimension. That is, the notch 180 may act as an electron beam impact area defining aperture. In another embodiment, the notch 180 has a size that is at least substantially equal to, or greater than a size of the electron beam impact area 90. For example, a width 182 of the notch 180 is at least equal to or greater than the width 174 of the electron beam impact area 90. The notch 180, as noted above, may have any geometry suitable for enabling the electron beam 70 to traverse in an area defined by the notch 180. In some embodiments, the notch 180 may act to restrict the electron beam 70 into the electron beam impact area.

As noted above, the notch 180 does not span the entire thickness 148 of the target layer 84. Rather, the target layer 84 has a first thickness outside of the notch 180 corresponding to the entire thickness 148 of the target layer 84, and a second thickness 186 at (i.e., underneath) the notch 180. While the ratio of the first thickness to the second thickness may be any ratio, in certain embodiments it is desirable for the first thickness (i.e., the thickness 148 of the target layer 84) to be larger than the second thickness 186, such as between approximately 50% larger and 10,000% larger than the second thickness 186. By way of non-limiting example, the first thickness (i.e., the thickness 148 of the target layer 84) may be at least 10% larger than the second thickness 186. In some embodiments, the first thickness (i.e., the thickness 148 of the target layer 84) may be between 2 and 100, 5 and 50, 10 and 25 times the second thickness 186. By way of non-limiting example, the first thickness may be approximately 1 mm and the second thickness 186 may be approximately 10 microns.

In some embodiments it may be desirable for the first thickness to be at least two orders of magnitude greater than the second thickness 186. Such a ratio may be desirable to ensure that a sufficient amount of each of the one or more materials of the target layer 84 is present in an area 188 outside of the notch 180 to enable the area 188 to act as a heat sink for dissipating heat away from the electron beam impact area 90.

As noted above, the X-ray source 14 is not limited to any particular number of vias, channels, notches, emitters, electron beams, and so on. Indeed, in some embodiments, more than one electron beam may be utilized to produce more than one focused X-ray beam. Examples of such embodiments are depicted in FIGS. 11 and 12. In particular, FIG. 11 depicts an embodiment of the X-ray source 14 in which the emitter 66 includes a plurality of emitting elements 190 arranged in rows 192. Specifically, the emitting elements 190 may be individually addressable (e.g., a voltage may be applied to each emitting element), or each row 192 may be separately addressable. Each of the rows 192 emits an electron beam 194, which together may produce an electron beam of uniform intensity that is directed toward the source target 80. In another embodiment, the emitting elements 190 emit electron beams 194, which together may produce an electron beam of non-uniform intensity that is directed toward the source target 80, wherein the high-intensity portions of the beam 194 coincide with the notches 196. This arrangement is useful when minimizing the electron beam impact on the non-notched target regions. For example, each row 192 may have a set of electron optics capable of focusing an electron beam 194 to a desired shape. In other words, each row 192 may be focused using similar focusing elements (e.g., 106, 108) to those described above with respect to FIG. 4.

In FIG. 11, the source target 80 includes an embodiment of the target layer 84 having a plurality of notches 196, which have geometries similar to the geometry of the notch 180 described above with respect to FIG. 10. Accordingly, the target layer 84 also has a plurality of corresponding electron impact areas 198 from which thermal energy is dissipated by the relatively large amount of target material surrounding each of the notches 196. The target layer 84 may produce an X-ray beam from each of the impact areas 198. The source target 80 also includes the bottom heat-spreading layer 140 and the X-ray window 88, both of which may have a higher overall thermal conductivity and lower melting point than the target layer 84. Again, such thermal conductivity may be advantageous to increase X-ray flux. While the notches are shown parallel to each other, this should not be considered the only possible arrangement. By way of non-limiting example, the notches could be arranged such that their long dimensions are co-linear. In other words, the notches may be arranged such that they are generally aligned with one another along their lengths.

The illustrated source 14 may also include a plurality of X-ray beam focusing elements 200, each of which collects and focuses a respective group of X-rays emitted from the source target 80. For example, because the source target 80 emits X-rays in a fan or cone shape, the focusing elements 200 may focus the beams into a plurality of substantially parallel X-ray beams 202 to be emitted toward a subject of interest. By way of non-limiting example, the X-ray beam focusing elements may be total external reflection polycapillary optics, multilayer diffractive optics, multilayer reflecting optics, total internal reflection multilayer optics, refractive replicated optics.

FIG. 12 depicts a similar embodiment of the X-ray source 14 as that depicted in FIG. 11, but the segmented version of the emitter 66 is replaced with a plurality of discrete emitter elements 210. Each emitter 210 may have at least a pair of electrodes 212 that run current through the emitter 210 to cause thermionic emission, field emission, or a combination thereof from the plurality of electron beams 194.

In addition to the change to the emitter 66, the embodiment of the source target 80 does not include a separate X-ray window from the bottom heat-spreading layer 140. Again, the bottom heat-spreading layer 140 may have a sufficient overall thermal conductivity, melting point, and X-ray transmissivity that it may serve as the X-ray window for the X-ray source 14.

Figure 13:
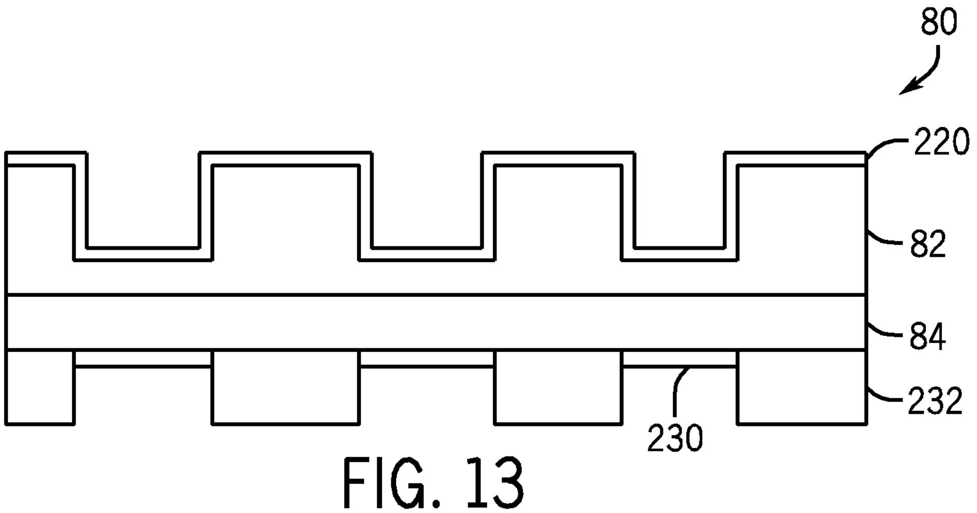
FIG. 13 is a schematic of an embodiment of the X-ray source of FIG. 1 wherein both the top and bottom heat spreader layers are microstructured.

It should be noted that the embodiments of the multilayer target structure are not limited to having only one top heat spreader, or only one of any particular layer for facilitating thermal conductance away from areas that are impacted by an electron beam. Indeed, many such layers may be utilized to facilitate cooling of the target 80. FIG. 13 depicts an embodiment of the target 80 in which a conformal conductive layer 220 is disposed on the top heat spreader 82 having microstructured channels, notches, or vias. In particular, the conformal conductive layer 220 is disposed as a relatively thin layer compared to the thickness of the top heat spreader 82, and is generally configured to prevent electrical charging of the top heat spreader 82, which may be desirable to prevent the repulsion of electrons (e.g., the electron beam 70). Furthermore, the conformal conductive layer 220 may have a high thermal conductivity along the length of each channel. The conformal conductive layer 220 may include any suitable conductive material, including metallic, semi-metallic, or carbon-based conductive materials.

The target 80 of FIG. 13 also includes the target layer 84 and two different window layers, which may also serve as bottom heat spreaders. The window layers include a set of first window elements 230 interleaved between a set of second window elements 232. The first window elements 230 may be transparent to the X-rays produced at the target layer 84 while the second window elements may be opaque to X-rays. Such an arrangement may be desirable to provide confinement of the X-ray beam, which is useful for applications such as phase contrast imaging. By way of example, the first window elements 230 may include diamond or beryllium, while the second window elements may include tungsten or another heavy element material, such as lead. Embodiments in which these layers are combined into a single layer is also contemplated. In other words, the total window portion of the source 14 may be a composite of different materials. Additionally, the first and/or second window elements 230, 232 may include as the first material closest to the target layer 84 a thin layer that minimizes the thermal resistance between the target layer 84 and the particular window/bottom heat-spreading layer. The thickness of this low thermal resistance layer is such that minimal X-ray absorption occurs in it.

Figure 14:
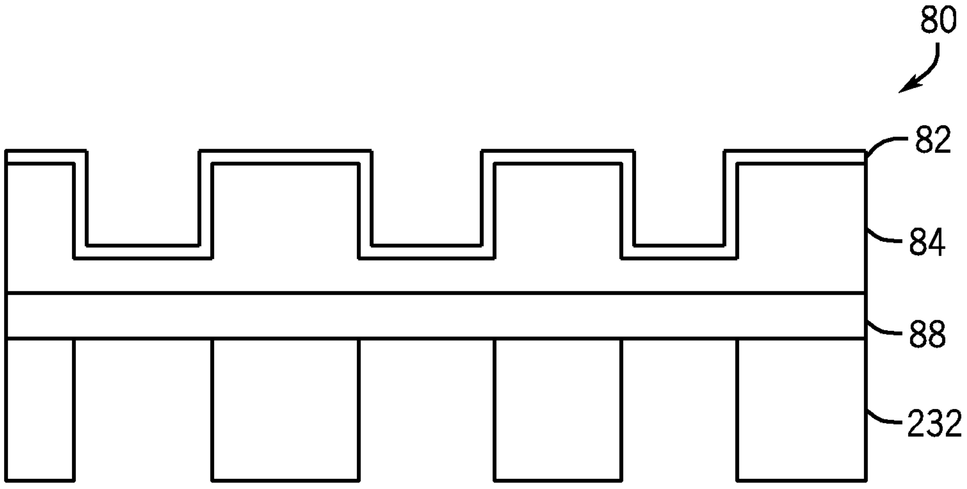
FIG. 14 schematic of an embodiment of the X-ray source of FIG. 1 wherein the top heat spreader and target layer are microstructured.

FIG. 14 depicts an embodiment in which the target layer 84 is microstructured in a similar manner to that depicted in FIG. 12, but including two window layers and an embodiment of the top heat spreader 82 having a conformal relationship with the target layer 84. The conformal top heat spreader 82 may have a relatively high thermal conductivity along the length of the channels.

The two window layers of the target 80 include the window layer 88 which, as noted above, is transparent to X-rays and may also act as a bottom heat spreader. The target 80 also includes the set of second window elements 232 described above with respect to FIG. 13, which are opaque to X-rays. It should be noted that in certain embodiments, the second window elements 232 may not necessarily be present, because the target layer 84 is microstructured. For example, the microstructured target layer may be sufficient to act as an aperture that confines the electron beam impact to a relatively small area (e.g., between 0.5 $\mu m^2$ and 2 $\mu m^2$, such as approximately 1 $\mu m^2$), which may be desirable for phase contrast imaging implementations. Further, the notches formed by the second window elements 232 may provide better thermal management in the areas immediately adjacent to where the X rays are generated and concomitantly contain the emitted x-ray beam(s), eliminating the need for post-source collimators.

This written description uses examples to disclose the invention, including the best mode, and also to enable any person skilled in the art to practice the invention, including making and using any devices or systems and performing any incorporated methods. The patentable scope of the invention is defined by the claims, and may include other examples and combinations that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An X-ray source, comprising:
one or more electron emitters configured to emit one or more electron beams;
one or more source targets configured to receive the one or more electron beams emitted by the one or more electron emitters and, as a result of receiving the one or more electron beams, to emit X-rays;
wherein each source target comprises:
a first layer comprising one or more first materials; and
a second layer in thermal communication with the first layer and comprising one or more second materials, wherein the first layer is positioned closer to the one or more electron emitters than the second layer, the first layer having a higher overall thermal conductivity than the second layer, and the majority of the X-rays emitted by the source target are produced in the second layer.

2. The X-ray source of claim 1, wherein the first layer has a higher overall lateral thermal conductivity than the second layer.

3. The X-ray source of claim 1, wherein the first layer has a higher overall melting point than the second layer.

4. The X-ray source of claim 1, wherein the second layer is a target layer having an electron beam impact area in which at least one of the one or more electron beams impinge on the target layer, and the first layer comprises a via or channel of the same, smaller, or larger size than the electron beam impact area.

5. The X-ray source of claim 4, wherein the first layer transmits heat away from the electron beam impact area when the electron beam impacts the target layer.

6. The X-ray source of claim 1, comprising an emitter assembly having the one or more electron emitters and one or more electron beam focusing elements, wherein the emitter assembly is configured to emit and focus at least one of the one or more electron beams such that the electron beam cross-section perpendicular to the electron flow direction has an aspect ratio of at least 500:1 when striking the source target.

7. The X-ray source of claim 1, wherein the first layer comprises a carbon-based material.

8. The X-ray source of claim 1, wherein the first layer comprises a metallic material and an underlying carbon-based material.

9. The X-ray source of claim 1, wherein the first layer comprises a metallic material.

10. The X-ray source of claim 1, wherein the first layer comprises one or more combinations of highly ordered pyrolytic graphite (HOPG), diamond, silver-diamond, beryllium oxide, silicon carbide, aluminum nitride, silicon nitride, alumina, copper-molybdenum, aluminum silicon carbide, or oxygen-free high conductivity copper.

11. The X-ray source of claim 1, wherein the second layer comprises one or more materials of molybdenum, tungsten, copper, silver, rhodium, rhenium, europium, samarium, or any combination thereof.

12. The X-ray source of claim 1, comprising a transition region coupling the first and second layers, wherein the transition region comprises a compositional gradient in a direction from the first layer to the second layer.

13. The X-ray source of claim 12, wherein the transition region comprises a transition layer configured to thermally and mechanically bridge the first and second layers.

14. The X-ray source of claim 13, wherein the first layer comprises at least one carbon-based material, and the transition layer more readily forms carbides when compared to the second layer.

15. The X-ray source of claim 13, wherein the transition layer comprises one or more layers comprising molybdenum carbide, silicon carbide, carbon, tungsten carbide, or any combination thereof.

16. The X-ray source of claim 1, comprising a third layer in thermal communication with the second layer and disposed on an opposite side of the second layer relative to the first layer, wherein the third layer comprises a third material that has a higher thermal conductivity than the second material.

17. The X-ray source of claim 16, wherein the third layer comprises an X-ray window out of which X-rays are emitted from the X-ray source.

18. The X-ray source of claim 17, wherein the X-ray window has a notch that is in alignment with the electron beam impact area and is approximately the same size as, larger than, or smaller than, the electron beam impact area.

19. The X-ray source of claim 16, wherein the third layer has a higher thermal conductivity in a direction parallel to the thickness of the third layer than the second layer.

20. The X-ray source of claim 16, wherein the third material comprises HOPG, diamond, silver-diamond, beryllium oxide, silicon carbide, aluminum nitride, alumina, copper-molybdenum, aluminum, silicon carbide, or any combination thereof.

21. The X-ray source of claim 1, wherein the second layer serves as an X-ray window out of which X-rays are emitted from the X-ray source.

22. The X-ray source of claim 1, comprising a cooling jacket disposed about at least a portion of the first layer, the second layer, or a combination thereof.

23. An X-ray source, comprising:
- one or more electron emitters configured to emit one or more electron beams;
- one or more stationary source targets configured to receive the one or more electron beams produced by the one or more emitters and, as a result of receiving the one or more electron beams, to emit X-rays; and
- wherein each source target comprises:
  - a target layer having one or more target materials; and
  - an electron beam impact area at which at least one of the one or more electron beams impinge on the target layer, and wherein the target layer comprises a notch disposed about the electron beam impact area.

24. The-ray source of claim 23, wherein the target layer serves as an X-ray window out of which X-rays are emitted from the X-ray source, and the target layer also serves as a vacuum barrier between an internal environment of the X-ray source and an external environment of the X-ray source, the internal environment having a lower pressure than the external environment.

25. The X-ray source of claim 23, wherein the target layer has a first thickness at the bottom of the notch, and a second thickness outside of the notch, and the second thickness is at least twice as large as the first.

26. The X-ray source of claim 23, wherein the target layer has a first thickness at the bottom of the notch, and a second thickness outside of the notch, and the second thickness is at least a half order of magnitude larger than the first.

27. The X-ray source of claim 23, wherein a channel formed by the notch in the target layer confines the electron beam, wherein the channel extends only partially through the thickness of the target layer.

28. The X-ray source of claim 23, wherein the region of the target layer defines the notch and serves as a heat sink that removes heat from the electron beam impact area when the at least one of the one or more electron beams impinge on the target layer.

29. The X-ray source of claim 23, wherein the source target comprises an additional layer in thermal communication with the target layer, and the additional layer has a higher overall thermal conductivity than the target material.

30. The X-ray source of claim 29, wherein the additional layer comprises highly ordered pyrolytic graphite (HOPG), diamond, silver-diamond, beryllium oxide, silicon carbide, aluminum nitride, alumina, copper-molybdenum, aluminum, silicon carbide, or any combination thereof.

31. The X-ray source of claim 29, comprising an X-ray window out of which X-rays are emitted from the X-ray source, wherein the X-ray window is in thermal communication with the target layer.

32. The X-ray source of claim 31, wherein the additional layer comprises the X-ray window.

33. The X-ray source of claim 31, comprising a cooling jacket disposed about at least a portion of the target layer, the additional layer, the X-ray window, or any combination thereof.

34. The X-ray source of claim 31, wherein the X-ray window has a higher overall thermal conductivity than the target layer.

35. The X-ray source of claim 34, wherein the X-ray window has a higher overall longitudinal thermal conductivity than the target layer.

36. The X-ray source of claim 31, wherein the X-ray window has a notch that is in alignment with the electron beam impact area and is the same size as, smaller than, or larger than, the electron beam impact area.

37. The X-ray source of claim 23, comprising an emitter assembly having the one or more electron emitters and one or more electron beam focusing elements, wherein the emitter assembly is configured to emit and focus at least one of the one or more electron beams such that the one or more electron beams have an aspect ratio of at least 500:1 when striking the source target.

38. An X-ray source, comprising:
- an emitter assembly having an emitter and one or more electron beam focusing elements, wherein the emitter assembly is configured to emit and focus an electron beam such that the electron beam has an aspect ratio of at least 500:1 at a site of impact;

a source target configured to receive, at the site of impact, the electron beam and, as a result of receiving the electron beam, to emit X-rays and an X-ray window out of which the X-rays are emitted from the X-ray imaging source.

39. The X-ray source of claim 38, wherein the aspect ratio of the electron beam is between 500:1 and 10000:1.

40. The X-ray source of claim 38, wherein the source target is a multilayer source target having a target layer, in which a majority of X-rays emitted by the X-ray source are produced, and an additional layer in thermal communication with the target layer, wherein the additional layer has a higher overall thermal conductivity than the target layer.

41. The X-ray source of claim 40, wherein the additional layer comprises the X-ray window.

42. The X-ray source of claim 40, wherein the additional layer is positioned between the target layer and the emitter assembly.

43. The X-ray source of claim 40, wherein the additional material comprises highly ordered pyrolytic graphite (HOPG), diamond, silver-diamond, beryllium oxide, silicon carbide, aluminum nitride, alumina, copper-molybdenum, aluminum silicon carbide, or any combination thereof.

44. The X-ray source of claim 38, comprising a cooling jacket in thermal communication with the X-ray window, wherein the cooling jacket is disposed at least partially outside of a vacuum seal of the X-ray imaging source.

45. The X-ray source of claim 38, wherein the X-ray window has a notch that is in alignment with the electron beam impact area and is approximately the same size as, smaller than, or larger than, the electron beam impact area.

* * * * *